(12) United States Patent
Yamamoto

(10) Patent No.: US 7,147,274 B2
(45) Date of Patent: Dec. 12, 2006

(54) WINDSHIELD SPACER

(75) Inventor: Yoichi Yamamoto, West Bloomfield, MI (US)

(73) Assignee: Nissan Technical Center North America MI (US)

( * ) Notice: Subject to any disclaimer, the term of this patent is extended or adjusted under 35 U.S.C. 154(b) by 85 days.

(21) Appl. No.: 10/933,445

(22) Filed: Sep. 3, 2004

(65) Prior Publication Data
US 2006/0049669 A1    Mar. 9, 2006

(51) Int. Cl.
B60J 1/02    (2006.01)
(52) U.S. Cl. .................... 296/201; 296/84.1
(58) Field of Classification Search .......... 296/201, 296/93, 84.1
See application file for complete search history.

(56) References Cited

U.S. PATENT DOCUMENTS

| | | | |
|---|---|---|---|
| 4,497,516 A | | 2/1985 | Morita et al. |
| 4,703,973 A | * | 11/1987 | Fujikawa .................. 296/201 |
| 4,712,341 A | * | 12/1987 | Harris et al. ................ 52/208 |
| 5,114,206 A | * | 5/1992 | Yada ........................ 296/201 |
| 5,139,302 A | | 8/1992 | Kanke |
| 5,355,651 A | * | 10/1994 | Correia ...................... 52/716.7 |
| 5,489,135 A | * | 2/1996 | Lipinski ................... 296/96.21 |
| 5,531,496 A | * | 7/1996 | Zbinden et al. ........... 296/96.21 |
| 5,695,236 A | * | 12/1997 | Banno et al. ............. 296/96.21 |
| 5,956,833 A | * | 9/1999 | Davis et al. ............... 29/281.1 |
| 6,070,930 A | * | 6/2000 | Takagi et al. ............. 296/96.21 |
| 6,170,208 B1 | | 1/2001 | Lambiris |
| 6,224,136 B1 | | 5/2001 | Takagi |
| 2003/0075947 A1 | | 4/2003 | Fujiwara |

FOREIGN PATENT DOCUMENTS

| | | |
|---|---|---|
| JP | 4-78719 | 3/1992 |
| JP | 2000-177506 | 6/2000 |

* cited by examiner

Primary Examiner—Jason Morrow
(74) Attorney, Agent, or Firm—Global IP Counselors

(57) ABSTRACT

A windshield spacer basically has a mounting portion and a windshield supporting portion. The mounting portion has a fastening structure configured and arranged to be fixedly coupled to a vehicle body part. The windshield supporting portion is integrally formed with the mounting portion, and configured and arranged relative to the mounting portion to restrict a movement of a windshield in a direction substantially parallel to a main surface of the windshield and in a direction substantially perpendicular to the main surface of the windshield. The windshield spacer preferably further includes a molding retaining portion integrally formed with the mounting portion, and configured and arranged relative to the mounting portion to rigidly retain a windshield molding.

30 Claims, 6 Drawing Sheets

WINDSHIELD SPACER

BACKGROUND OF THE INVENTION

1. Field of the Invention

The present invention generally relates to a windshield spacer. More specifically, the present invention relates to a windshield spacer used in side edge portions of the windshield, which improves molding rigidity and positioning precision of the windshield with respect to a vehicle body part.

2. Background Information

In a conventional windshield assembly for a front side portion of a vehicle, a windshield molding is provided that covers the area where the windshield is mounted on a left or right front pillar of the vehicle. In such conventional windshield assembly, one edge of the windshield molding is fixedly coupled to the front pillar using a grommet and a screw. Consequently, the windshield molding is required to be made of a relatively thicker material so that a stiffness or rigidity of the windshield molding mounted on the front pillar is ensured. Also, in the conventional windshield assembly, the windshield is installed in a windshield opening of the vehicle body as being positioned in a direction perpendicular to a main surface of the windshield by using a dam rubber adhered on the peripheral surface of the windshield. However, due to a compression force imparted to the windshield in the direction perpendicular to the windshield during the assembly process, the dam rubber is compressed and irregularly deformed between the windshield and the vehicle body parts on which the windshield is mounted. This irregular deformation of the dam rubber causes a variation in a gap between the windshield and the windshield molding.

Moreover, in the conventional windshield assembly, windshield locator clips/pins are usually provided at a top and/or bottom portion of the windshield for positioning the windshield in longitudinal direction of the vehicle body that is substantially parallel to the main surface of the windshield. However, no locator clip or the like is usually provided on the side portions of the windshield where the windshield is mounted on the front pillars for positioning the windshield in a transverse direction. Accordingly, a transverse position of the windshield with respect to the vehicle body may be offset from a prescribed position indicated by positioning marks provided on the windshield. In such case, the appearance of the windshield assembly from the interior of the vehicle is degraded because the positioning marks appearing on the left and right side of the windshield becomes uneven as seen from the interior of the vehicle.

In view of the above, it will be apparent to those skilled in the art from this disclosure that there exists a need for an improved windshield spacer. This invention addresses this need in the art as well as other needs, which will become apparent to those skilled in the art from this disclosure.

SUMMARY OF THE INVENTION

One object of the present invention is to provide a windshield spacer that provides an improved molding rigidity and positioning precision of the windshield with respect to the vehicle body without using a separate dam rubber.

In accordance with one aspect of the present invention, a windshield spacer is provided that comprises a mounting portion and a windshield supporting portion. The mounting portion has a fastening structure configured and arranged to be fixedly coupled to a vehicle body part. The windshield supporting portion is integrally formed with the mounting portion, and configured and arranged relative to the mounting portion to restrict a movement of a windshield in a direction substantially parallel to a main surface of the windshield and in a direction substantially perpendicular to the main surface of the windshield.

In accordance with another aspect of the present invention, a windshield spacer comprises a windshield supporting portion and a molding retaining portion. The windshield supporting portion is configured and arranged to restrict a movement of a windshield in a direction substantially parallel to a main surface of the windshield and in a direction substantially perpendicular to the main surface of the windshield. The molding retaining portion is integrally formed with the windshield supporting portion, and configured and arranged relative to the windshield supporting portion to rigidly retain a windshield molding.

In accordance with another aspect of the present invention, a windshield spacer comprises a mounting portion, a windshield edge abutment portion, and a molding retaining portion. The mounting portion has a fastening structure configured and arranged to be fixedly coupled to a vehicle body part. The windshield edge abutment portion is integrally formed with the mounting portion, and configured and arranged relative to the mounting portion to restrict a movement of a windshield in a direction substantially parallel to a main surface of the windshield. The molding retaining portion is integrally formed with the mounting portion, and configured and arranged relative to the mounting portion to rigidly retain a windshield molding.

In accordance with another aspect of the present invention, a windshield assembly comprises a front pillar, a windshield, and a windshield spacer. The front pillar extends in a generally longitudinal direction of a vehicle and includes a windshield receiving portion. The windshield has a side edge portion mounted on the windshield receiving portion of the front pillar. The windshield spacer includes a mounting portion and a windshield supporting portion. The mounting portion has a fastening structure configured and arranged to be fixedly coupled to the front pillar. The windshield supporting portion is integrally formed with the mounting portion, and configured and arranged relative to the mounting portion to restrict a movement of a windshield at least in a transverse direction substantially parallel to a main surface of the windshield.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
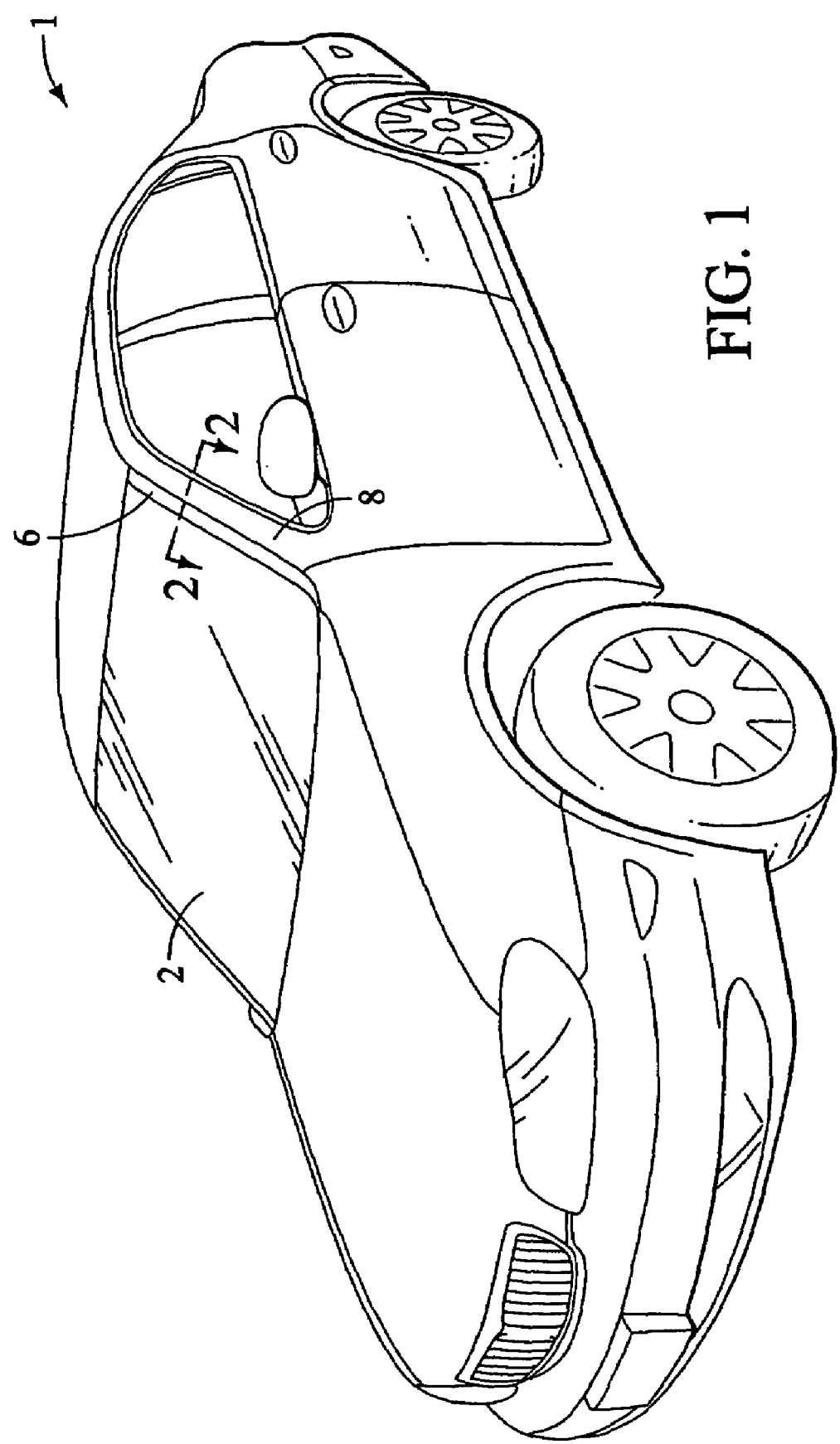
FIG. 1 is an overall perspective view of a vehicle in which a windshield is mounted on a front portion of the vehicle in accordance with a preferred embodiment of the present invention.
Figure 2:
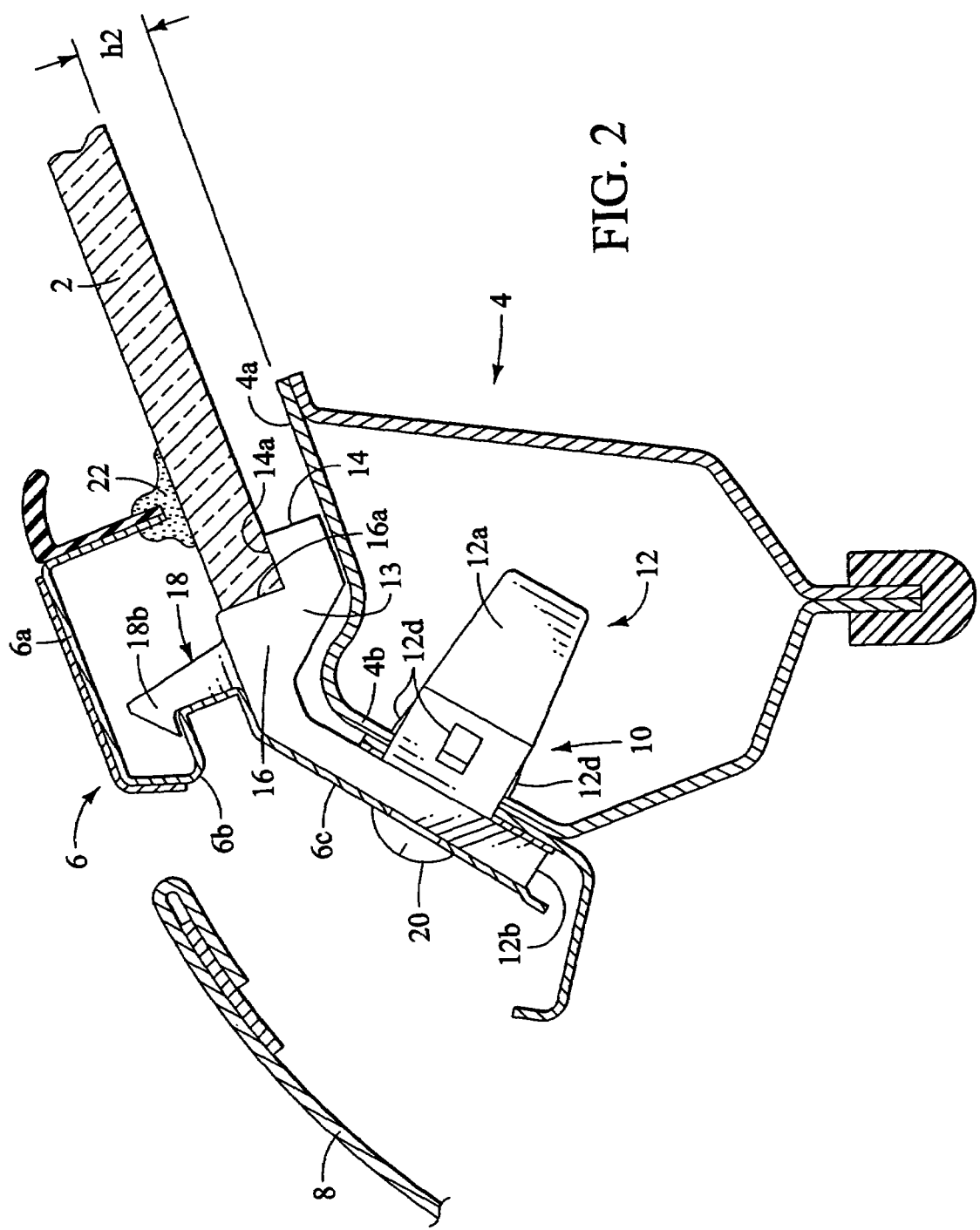
FIG. 2 is a partial cross sectional view of a front side portion of the vehicle illustrated in FIG. 1 taken along a section line 2—2 in FIG. 1 in accordance with the preferred embodiment of the present invention.
Figure 3:
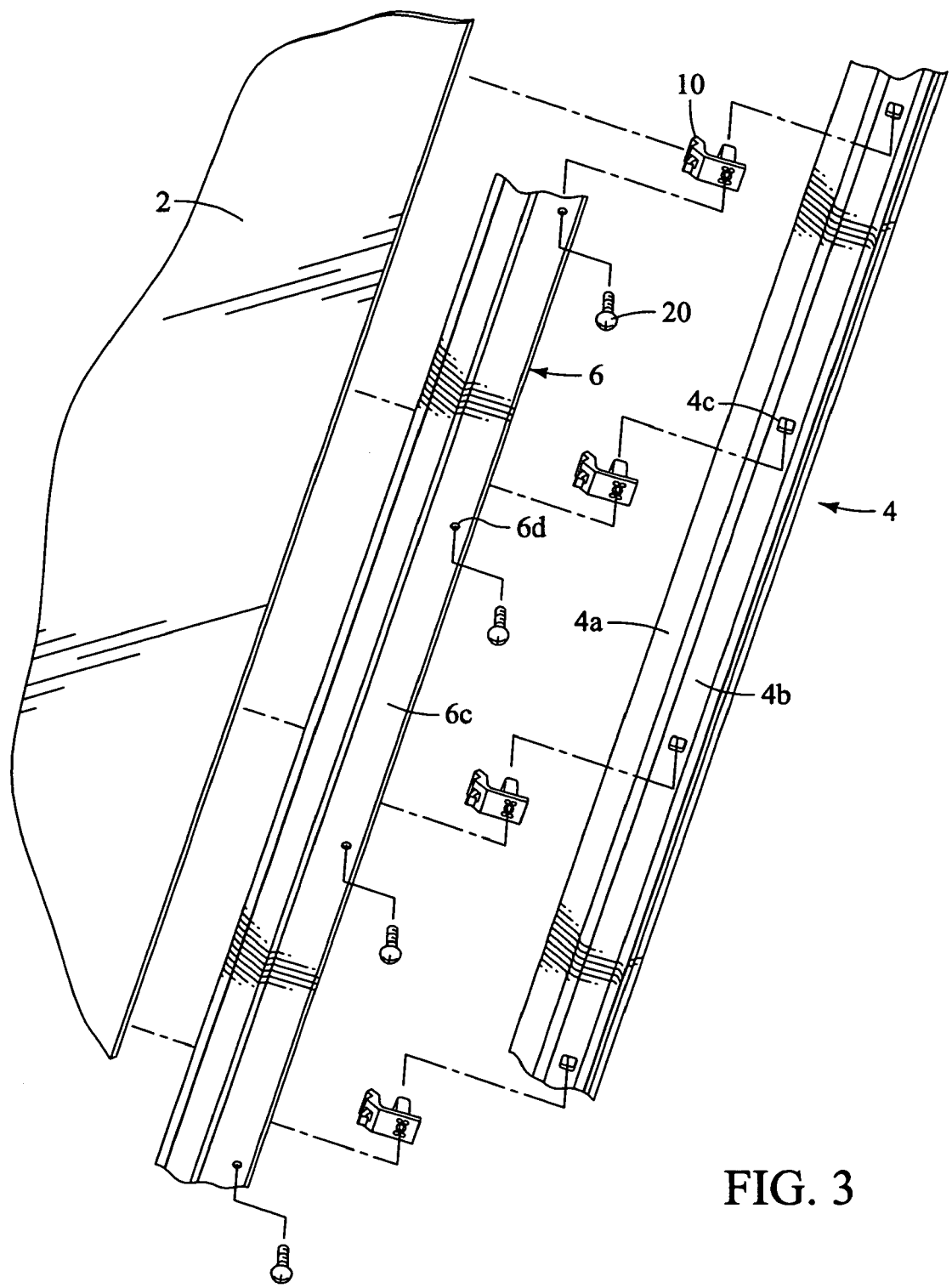
FIG. 3 is an exploded perspective view illustrating a windshield molding, the windshield, a windshield spacer, and a front pillar of the vehicle illustrated in FIGS. 1 and 2 in accordance with the preferred embodiment of the present invention.

FIGS. 1 to 3 illustrates a windshield assembly for a side portion of a vehicle 1 in which a windshield 2 is mounted on a front pillar 4 of the vehicle 1 using a plurality of windshield spacers 10 in accordance with a preferred embodiment of the present invention. In the present invention, by using the windshield spacers 10, the windshield 2 can be precisely positioned with respect to the front pillars 4 in a transverse direction and in a direction perpendicular to the main surface of the windshield 2. Moreover, each of the windshield spacers 10 is further configured and arranged to reinforce a coupling between the front pillar 4 and a windshield molding 6 that is disposed over the side edge portion of the windshield 2. The windshield spacer 10 will be discussed in more detail below.

As seen in FIG. 1, the windshield 2 is mounted in a windshield opening formed in a front portion of the vehicle 1. More specifically, as seen in FIGS. 2 and 3, side edge portions of the windshield 2 are mounted on left and right front pillars (only the left front pillar 4 is shown) that extend in generally vertical and longitudinal direction on both sides of the vehicle 1. The left and right sides of the windshield assembly for the vehicle 1 including the left and right front pillars 4 are essentially mirror images as to the structures that relate to the present invention. Thus, only the windshield assembly on the driver's side (left side) of the vehicle 1 will be discussed and/or illustrated in detail herein.

As seen in FIGS. 2 and 3, the front pillar 4 is preferably a generally tubular member with a closed cross section having a front portion 4a and a side portion 4b. As seen in FIG. 2, the front portion 4a of the front pillar 4 is disposed on the front with respect to the vehicle 1 and the side portion 4b of the front pillar 4 is disposed on the transverse side with respect to the vehicle 1. The front portion 4a of the front pillar 4 is configured and arranged to receive the side edge portion of the windshield 2. As seen in FIG. 3, the side portion 4b of the front pillar 4 preferably includes four mounting holes 4c that are equally spaced apart for fixedly coupling the windshield molding 6 to the front pillar 4. Of course, it will be apparent to those skilled in the art from this disclosure that the precise number and locations of the mounting holes 4c of the front pillar 4 are not limited to the arrangement disclosed in this preferred embodiment of the present invention. More specifically, the number and locations of the mounting holes 4c can be varied depending on the structure of the front pillar 4 and other various conditions of the structure of the vehicle 1. The side portion 4b of the front pillar 4 is preferably covered by a front edge of a front door 8 when the front door 8 is closed as seen in FIGS. 1 and 2.

The windshield molding 6 is configured and arranged to cover the side edge portion of the windshield 2 mounted on the front portion 4a of the front pillar 4. As seen in FIG. 3, the windshield molding 6 extends substantially parallel to the front pillar 4 for protecting a coupling section between the windshield 2 and the front pillar 4 from external objects, and for improving an external appearance of the front side portion of the vehicle 1.

More specifically, the windshield molding 6 is preferably made of a rigid material such as a stainless steel. The windshield molding 6 can also be provided with a outer cover made of a flexible material for improving an external appearance of the windshield molding 6. As seen in FIG. 2, the windshield molding 6 preferably has a front edge section 6a having a generally L-shaped cross section, a middle section 6b having a generally S-shaped cross section, and a generally flat shaped rear edge section 6c. The rear edge section 6c of the windshield molding 6 is preferably fixedly coupled to the side portion 4b of the front pillar 4 such that the front edge section 6a of the windshield molding 6 substantially overlaps with the side edge portion of the windshield 2 in a front view of the vehicle 1. More specifically, as seen in FIG. 3, the rear edge section 6c of the windshield molding 6 preferably includes four fixing holes 6d at positions that correspond to positions of the mounting holes 4c of the front pillar 4. The rear edge section 6c of the windshield molding 6 is fixedly coupled to the side portion 4b of the front pillar 4 through the fixing holes 6d by using the windshield spacer 10 and a screw 20 as seen in FIGS. 2 and 3.

More specifically, the windshield spacer 10 is disposed between the mounting hole 4c of the front pillar 4 and the fixing hole 6d of the windshield molding 6 as seen in FIG. 2. The windshield spacer 10 is preferably used at each of the four mounting portions of the mounting holes 4c of the front pillar 4 and the fixing holes 6d of the windshield molding 6 as seen in FIG. 3. The windshield spacer 10 is configured and arranged to reinforce the coupling rigidity of the windshield molding 6 and the front pillar 4, and to improve the positioning precision of the windshield 2 with respect to the front pillar 4.

Figure 4:
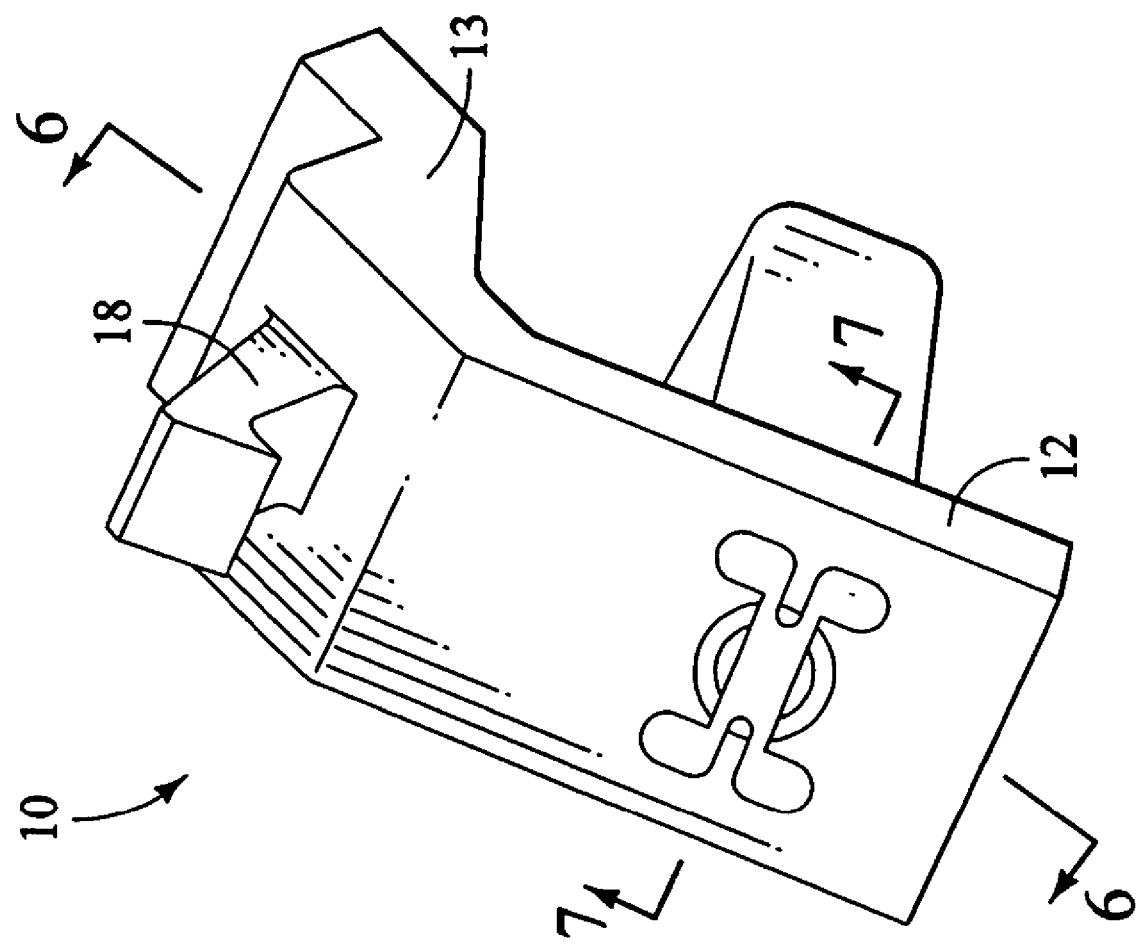
FIG. 4 is an enlarged perspective view of the windshield spacer in accordance with the preferred embodiment of the present invention.

Referring now to FIGS. 4 to 8, the windshield spacer 10 will be explained in more detail. As seen in FIG. 4, the windshield spacer 10 basically comprises a mounting portion 12, a windshield supporting portion 13 and a molding retaining portion 18. The mounting portion 12, the windshield supporting portion 13, and the molding retaining portion 18 are preferably integrally formed as a unitary, one-piece member. Moreover, the windshield spacer 10 is preferably made of a relatively resilient material such as a synthetic resin (e.g., POM (polyoxymethylene) and PBT (polybutylene terephthalate)). Of course, it will be apparent to those skilled in the art from this disclosure that the material of the windshield spacer 10 is not limited to the synthetic resin. Rather, any kind of material can be utilized for the windshield spacer 10 as long as the material is suitable for carrying out the present invention.

The mounting portion 12 of the windshield spacer 10 is basically configured and arranged to be fixedly coupled to one of the mounting holes 4c provided on the side portion 4b of the front pillar 4. Moreover, the mounting portion 12 of the windshield spacer 10 is also configured and arranged to receive the screw 20 inserted into the fixing hole 6d of the windshield molding 6 for fixedly coupling the windshield molding 6 between the mounting portion 12 and the screw 20. Thus, the mounting portion 12 of the windshield spacer 10 is configured and arranged to fixedly couple the windshield molding 6 to the side portion 4b the front pillar 4.

More specifically, the mounting portion 12 of the windshield spacer 10 includes a fastening structure having a grommet member. As seen in FIGS. 4 to 8, the grommet member of the mounting portion 12 basically comprises a main body 12a, a flange 12b, a fastening bore 12c and a plurality of fastening detents or projections 12d. The main body 12a is basically an elongated member having a generally rectangular cross section. The flange 12b radially extends from a first axial end of the main body 12a. The fastening bore 12c is axially centrally located in the main body 12a. The fastening bore 12c is a blind bore that has an opening on the first axial end for receiving the screw 20 and a second closed axial end.

Figure 6:
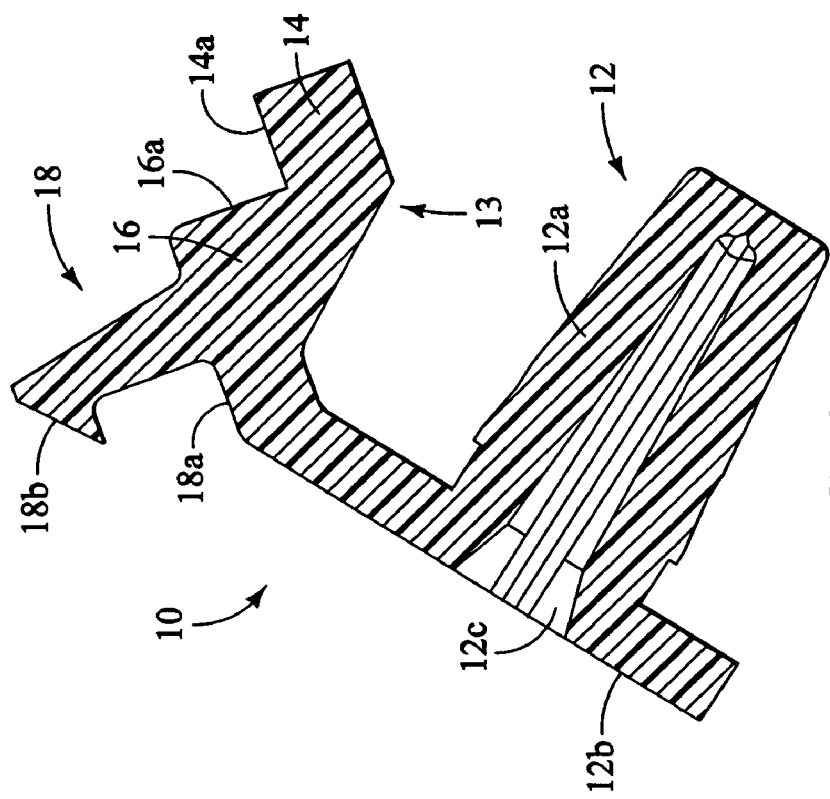
FIG. 6 is a cross sectional view of the windshield spacer illustrated in FIGS. 4 and 5 taken along a section line 6—6 in FIG. 4 in accordance with the preferred embodiment of the present invention.
Figure 8:
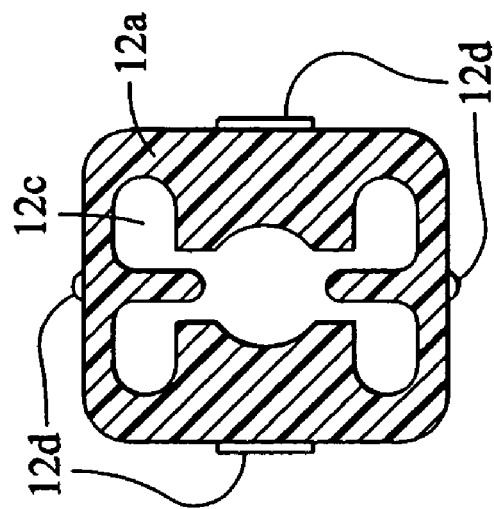
FIG. 8 is a cross sectional view of the windshield spacer illustrated in FIGS. 4 to 7 taken along a section line 8—8 in FIG. 7 in accordance with the preferred embodiment of the present invention.
Figure 7:
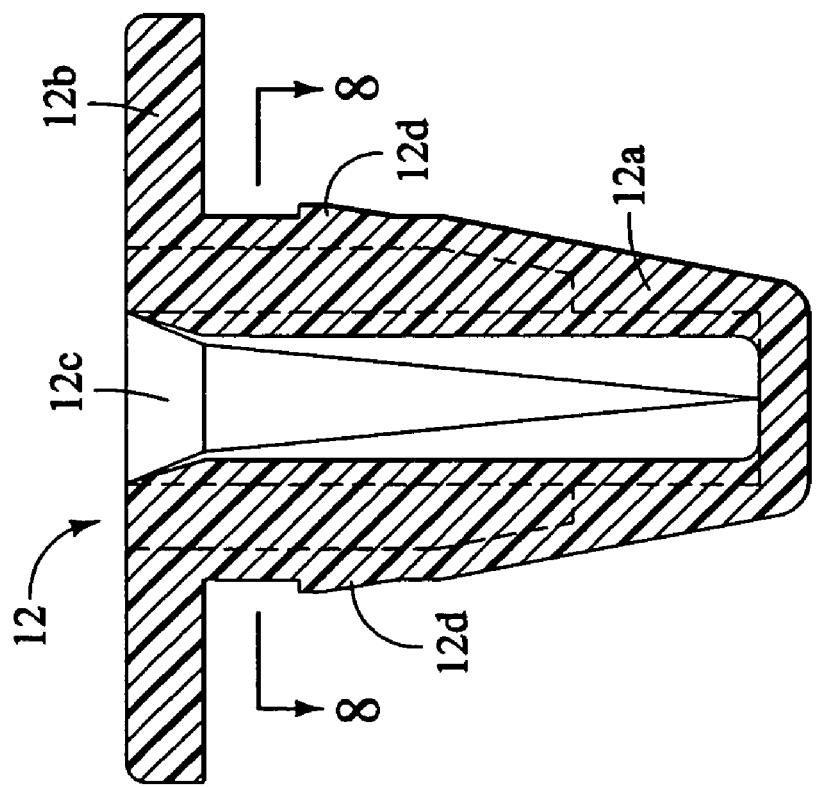
FIG. 7 is a cross sectional view of the windshield spacer illustrated in FIGS. 4 to 6 taken along a section line 7—7 in FIG. 4 in accordance with the preferred embodiment of the present invention.

As seen in FIGS. 6 to 8, the fastening bore 12c includes a screw retaining structure that is integrally formed with the fastening bore 12c and configured and arranged to rigidly retain the screw 20 inserted into the fastening bore 12c. Of course, it will be apparent to those skilled in the art from this disclosure that the screw retaining structure of the fastening bore 12c is not limited to the one disclosed in this preferred embodiment of the present invention. Rather, any kind of internal structure can be utilized as the screw retaining structure as long as the structure is configured and arranged to rigidly retain a screw within the fastening bore 12c.

The fastening projections 12d are preferably disposed on the outer circumference surface of the main body 12a adjacent to the flange 12b. The fastening projections 12d are ramp shaped elements that form a plurality of abutment surfaces facing the flange 12b. More specifically, as seen in FIG. 8, four fastening projections 12d are preferably provided so that each of the fastening projections 12d is disposed on each of the four sides of the main body 12a. Of course, it will be apparent to those skilled in the art from this disclosure that number of fastening protrusions 12d is not limited to four and can be varied depending on the various design factors of the windshield spacer 10.

The windshield supporting portion 13 of the windshield spacer 10 is arranged with respect to the mounting portion 12 of the windshield spacer 10 such that the windshield supporting portion 13 is positioned adjacent to the front portion 4a of the front pillar 4 when the mounting portion 12 of the windshield spacer 10 is coupled to the side portion 4b of the front pillar 4. Moreover, as seen in FIGS. 4 to 6, the windshield supporting portion 13 includes a windshield bottom abutment portion 14 with a bottom abutment surface 14a and a windshield edge abutment portion 16 with an edge abutment surface 16a.

The windshield bottom abutment portion 14 is preferably configured and arranged to be disposed on the front portion 4a of the front pillar 4 such that the bottom abutment surface 14a extends substantially parallel to the front portion of the front pillar 4 when the mounting portion 12 of the windshield spacer 10 is coupled to the side portion 4b of the front pillar 4. The windshield bottom abutment portion 14 is preferably configured and arrange to have a height $h_1$ (distance from the bottom abutment surface 14a to the front portion 4a of the front pillar 4) as seen in FIG. 5. The height $h_1$ (FIG. 5) is preferably set to substantially equal to a prescribed clearance $h_2$ between the front portion 4b of the front pillar 4 and the windshield 2 in a direction perpendicular to the main surface of the windshield 2 as seen in FIG. 2.

The windshield edge abutment portion 16 of the windshield supporting portion 13 preferably extends substantially perpendicularly from the windshield bottom abutment portion 14 in a direction opposite from the front portion 4a of the front pillar 4 when the windshield spacer 10 is coupled to the front pillar 4. Thus, the edge abutment surface 16a of the windshield edge abutment portion 16 and the bottom abutment surface 14a of the windshield bottom abutment portion 14 are configured and arranged to cross at approximately right angles. Moreover, the windshield edge abutment portion 16 is preferably configured and arranged such that the edge abutment surface 16a is positioned at a prescribed distance from the side portion 4b of the front pillar 4 in a direction parallel to the windshield 2 when the windshield spacer 10 is coupled to the front pillar 4.

Figure 5:
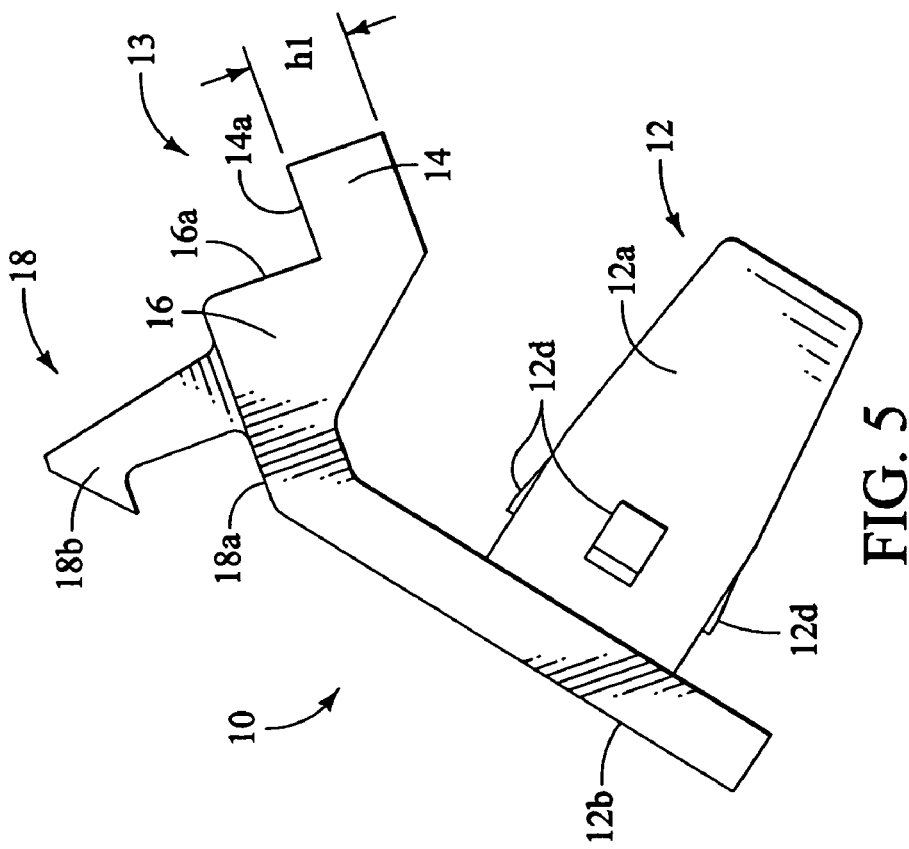
FIG. 5 is a side elevational view of the windshield spacer illustrated in FIG. 4 in accordance with the preferred embodiment of the present invention.

As seen in FIGS. 4 to 6, the molding retaining portion 18 of the windshield spacer 10 is disposed between the mounting portion 12 and the windshield supporting portion 13 and extends in a direction substantially parallel to the edge abutment surface 16a of the windshield edge abutment portion 16. As seen in FIGS. 5 and 6, the molding retaining portion 18 includes a base portion 18a that is continuously formed between the flange 12b of the mounting portion 12 and the windshield edge abutment portion 16 of the windshield supporting portion 13. The base portion 18a of the molding retaining portion 18 and the flange 12b of the mounting portion 12 preferably form a continuous outer surface that substantially conform with an inner surface of the rear portion 6c and the middle section 6b of the windshield molding 6. Moreover, as seen in FIGS. 4 to 6, the molding retaining portion 18 includes a free end with a hook part 18b. The hook part 18b is configured and arranged to releasably engage with a winding portion of the S-shaped middle section 6b of the windshield molding 6 when the windshield molding 6, the front pillar 4 and the windshield spacer 10 are assembled together.

Referring back to FIGS. 2 and 3, an assembly process of the side edge portions of the windshield 2 to the front pillars 4 will be now explained. When the windshield 2 is mounted on the front pillars 4, first the mounting portion 12 of each of the windshield spacers 10 is coupled to the corresponding one of the mounting holes 4c of the front pillars 4. More specifically, the main body 12a of the mounting portion 12 is inserted into the mounting hole 4c, such that the sheet metal of the front pillars 4 are disposed between the fastening projections 12d and the flange 12b of the mounting portion 12 as seen in FIG. 2.

Next, a primer and an adhesive 22 are applied to at least one outer surface of each of the side edge portions of the windshield 2. Then the side edge portions of the windshield 2 are placed on the windshield supporting portions 13 of the windshield spacers 10 that are disposed on the front portions 4a of the front pillars 4. More specifically, the side edge portions of the windshield 2 are positioned such that each transverse edge of the windshield 2 abuts against the edge abutment surface 16a of the windshield edge abutment portion 16 as seen in FIG. 2. Thus, the windshield 2 is installed in a prescribed position with respect to the front pillars 4 in the transverse direction of the vehicle 1 that is parallel to the windshield 2. Simultaneously, the windshield 2 is positioned such that the bottom surface of the side edge portion of the windshield 2 abuts against the bottom abutment surface 14a of the windshield bottom abutment portion 14 of each of the windshield spacers 10 as seen in FIG. 2. Therefore, the windshield 2 is installed in a prescribed position with respect to the front pillars 4 in a direction perpendicular to the windshield 2. Accordingly, by using the windshield spacers 10, the windshield 2 is appropriately aligned with respect to the front pillars 4 and placed in the prescribed position.

After the windshield 2 is placed in the prescribed position, the rear edge section 6c of the windshield molding 6 is fixedly coupled to the side portion 4b of one of the front pillars 4 by inserting the screw 20 into the mounting portion 12 of the windshield spacer 10. More specifically, the rear edge section 6c of the windshield molding 6 is disposed on the side portion 4b of the front pillar 4 such that each of the fixing holes 6d of the windshield molding 6 is aligned with the fastening bore 12c of the corresponding one of the windshield spacers 10 as seen in FIG. 3. Then, the screw 20 is inserted into each of the fixing holes 6d of the windshield molding 6 and the fastening bore 12c of the corresponding one of the windshield spacers 10. Since the fastening bore 12c has the screw retaining structure inside of the fastening bore 12c, the screw 20 is rigidly retained within the fastening bore 12c. Accordingly, the rear edge section 6c of the windshield molding 6 is fixedly coupled to the mounting portion 12 of the windshield spacer 10.

Moreover, as the screw 20 is inserted into the fastening bore 12c, the fastening projections 12d of the mounting portion 12 of the windshield spacer 10 are configured and arranged to rigidly engage an inner circumferential surface of the side portion 4b of the front pillar 4 around the corresponding mounting hole 4c. Thus, each of the windshield spacer 10 is prevented from being unfasten from the front pillar 4 by the fastening projections 12d. Consequently, the rear edge section 6c of the windshield molding 6 is fixedly coupled to the side portion 4b of the front pillar 4 via the mounting portion 12 of the windshield spacer 10 as seen in FIG. 2.

Furthermore, when the windshield molding 6 is mounted on the front pillar 4, the hook part 18b of the molding retaining portion 18 of each of the windshield spacer 10 engages with the bent portion of the middle section 6b of the windshield molding 6 as seen in FIG. 2. Since the molding retaining portion 18 is integrally formed with the mounting portion 12, the windshield molding 6 is rigidly retained with the front pillar 4 by the molding retaining portion 18 of the windshield spacer 10.

Finally, the side edge portion of the windshield 2 is coupled to the front edge portion 6a of the windshield molding 6 by the adhesive 22.

Accordingly, since the windshield spacer 10 includes the windshield supporting portion 13, the positioning precision of the windshield 2 with respect to the front pillar 4 in a transverse direction parallel to the main surface of the windshield 2 and in a direction perpendicular to the windshield 2 is improved. Thus, the use of a dam rubber on the peripheral surface of the windshield 2 can be eliminated by using the windshield spacer 10 of the present invention. Moreover, since the molding retaining portion 18 is formed in the windshield spacer 10, the windshield spacer 10 also improves a coupling rigidity between the windshield molding 6 and the front pillar 4. In other words, the strength of the windshield molding 6 can be ensured without making the windshield molding 6 thicker.

Although, in the above explained embodiment of the present invention, the windshield spacer 10 is used for each of the four mounting points of the windshield molding 6 and the front pillar 4, it will be apparent to those skilled in the art from this disclosure that the windshield spacer 10 is not required to be used in each of the four mounting points. For example, the windshield 2 can be mounted on the front pillars 4 by installing only two or three of the windshield spacers 10 in two or three of the four mounting points of each of the windshield moldings 6 and each of the front pillars 4. In such case, a conventional grommet is preferably used for the rest of the mounting point(s) to fixedly couple the rear edge portion 6c of the windshield molding 6 to the side portion 4b of the front pillar 4 instead of the windshield spacer 10 of the present invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A windshield spacer structure comprising:
   a windshield spacer including
      a mounting portion having a fastening structure configured and arranged to be fixedly coupled to a vehicle body part, and
      a windshield supporting portion integrally formed with the mounting portion, and configured and arranged relative to the mounting portion to restrict a movement of a windshield in a direction substantially parallel to a main surface of the windshield and in a direction substantially perpendicular to the main surface of the windshield;
   a windshield molding; and
   a fastener releasably fastening the windshield molding to the fastening structure of the mounting portion and fixedly coupling the fastening structure to the vehicle body part upon installing the fastener.

2. The windshield spacer structure as recited in claim 1, wherein
   the windshield supporting portion includes a windshield edge abutment portion and a windshield bottom abutment portion, wherein the windshield bottom abutment portion extends substantially perpendicularly from the windshield edge abutment portion toward a first side of the windshield edge abutment portion.

3. A windshield spacer comprising:
a mounting portion having a fastening structure configured and arranged to be fixedly coupled to a vehicle body part;
a windshield supporting portion integrally formed with the mounting portion, and configured and arranged relative to the mounting portion to restrict a movement of a windshield in a direction substantially parallel to a main surface of the windshield and in a direction substantially perpendicular to the main surface of the windshield, the windshield supporting portion including a windshield edge abutment portion and a windshield bottom abutment portion, wherein the windshield bottom abutment portion extends substantially perpendicularly from the windshield edge abutment portion toward a first side of the windshield edge abutment portion,
the mounting portion being disposed on a second side of the windshield edge abutment portion of the windshield supporting portion that is opposite from the first side.

4. The windshield spacer structure as recited in claim 1, wherein
the fastening structure of the mounting portion includes a grommet member with at least one fastening projection configured and arranged to be retained in the vehicle body part.

5. The windshield spacer structure as recited in claim 2, further comprising
a molding retaining portion integrally formed with the mounting portion, and configured and arranged relative to the mounting portion to rigidly retain the windshield molding.

6. The windshield spacer structure as recited in claim 5, wherein
the molding retaining portion is disposed between the mounting portion and the windshield supporting portion, and extends in a direction substantially parallel to the windshield edge abutment portion of the windshield supporting portion.

7. The windshield spacer structure as recited in claim 5, wherein
the molding retaining portion includes a free end having a hook part configured and arranged to engage the windshield molding.

8. The windshield spacer structure as recited in claim 5, wherein
the mounting portion, the windshield supporting portion and the molding retaining portion are formed as a unitary, one-piece member.

9. The windshield spacer structure as recited in claim 1, further comprising
a molding retaining portion integrally formed with the windshield supporting portion, and configured and arranged relative to the windshield supporting portion to rigidly retain the windshield molding.

10. The windshield spacer structure as recited in claim 5, wherein
the molding retaining portion is disposed on a second side of the windshield edge abutment portion of the windshield supporting portion that is opposite from the first side.

11. The windshield spacer structure as recited in claim 5, wherein
the molding retaining portion extends in a direction substantially parallel to the windshield edge abutment portion of the windshield supporting portion.

12. The windshield spacer structure as recited in claim 9, wherein
the molding retaining portion includes a free end having a hook part configured and arranged to engage the windshield molding.

13. A windshield spacer comprising:
a mounting portion having a fastening structure configured and arranged to be fixedly coupled to a vehicle body part; and
a windshield edge abutment portion integrally formed with the mounting portion, and configured and arranged relative to the mounting portion to restrict a movement of a windshield in a direction substantially parallel to a main surface of the windshield;
the fastening structure of the mounting portion including a grommet member having a main body with a fastening bore extending along a center axis of the main body and at least one fastening projection protruding from the main body radially outwardly with respect to the center axis of the main body, the at least one fastening projection being configured and arranged to retain the main body in the vehicle body part.

14. The windshield spacer as recited in claim 13, further comprising
a molding retaining portion integrally formed with the mounting portion, and configured and arranged relative to the mounting portion to rigidly retain a windshield molding.

15. The windshield spacer as recited in claim 14, wherein
the molding retaining portion is disposed between the windshield edge abutment portion and the mounting portion, and extends in a direction substantially parallel to the windshield edge abutment portion.

16. The windshield spacer as recited in claim 14, wherein
the molding retaining portion includes a free end having a hook part configured and arranged to engage the windshield molding.

17. A windshield assembly comprising:
a front pillar extending in a generally longitudinal direction of a vehicle including a windshield receiving portion;
a windshield having a side edge portion mounted on the windshield receiving portion of the front pillar;
a windshield molding extending over the side edge portion of the windshield in a direction substantially parallel to the front pillar;
a windshield spacer including
a mounting portion having a fastening structure fixedly coupled to the front pillar, and
a windshield supporting portion integrally formed with the mounting portion, and configured and arranged relative to the mounting portion to restrict a movement of the windshield at least in a transverse direction substantially parallel to a main surface of the windshield; and
a fastener releasably fastening the windshield molding to the fastening structure of the mounting portion and fixedly coupling the fastening structure to the front pillar upon installing the fastener.

18. The windshield assembly as recited in claim 17, wherein
the windshield supporting portion of the windshield spacer is further configured and arranged to restrict a movement of the windshield in a direction substantially perpendicular to the main surface of the windshield.

19. The windshield assembly as recited in claim 18, wherein
the windshield supporting portion of the windshield spacer includes a windshield bottom abutment portion disposed between the side edge portion of the windshield and the front pillar to restrict the movement of the windshield in the direction substantially perpendicular to the main surface of the windshield and a windshield edge abutment portion extending substantially perpendicularly from the windshield bottom abutment portion to restrict the movement of the windshield in the transverse direction substantially parallel to the main surface of the windshield.

20. The windshield assembly as recited in claim 19, wherein
the mounting portion of the windshield spacer is coupled to an outer portion of the front pillar that is disposed outwardly with respect to the windshield receiving portion of the front pillar.

21. The windshield assembly as recited in claim 17, wherein
the fastening structure of the mounting portion includes a grommet member with at least one fastening projection configured and arranged to be retained in the vehicle body part.

22. The windshield assembly as recited in claim 17, wherein
the windshield spacer further includes a molding retaining portion integrally formed with the mounting portion, and releasably coupled to the windshield molding.

23. The windshield assembly as recited in claim 22, wherein
the fastening structure of the mounting portion is further configured and arranged to fixedly couple the windshield molding to the front pillar at the outer portion of the front pillar.

24. The windshield assembly as recited in claim 22, wherein
the molding retaining portion of the windshield spacer is disposed between the mounting portion and the windshield supporting portion, and extends outwardly with respect to the vehicle in a direction substantially perpendicular to the main surface of the windshield.

25. The windshield assembly as recited in claim 22, wherein
the molding retaining portion includes a free end having a hook part that engages the windshield molding.

26. A windshield assembly comprising:
a front pillar extending in a generally longitudinal direction of a vehicle including a windshield receiving portion;
a windshield having a side edge portion mounted on the windshield receiving portion of the front pillar; and
a windshield spacer including
a mounting portion having a fastening structure fixedly coupled to an outer portion of the front pillar that is disposed outwardly with respect to the windshield receiving portion of the front pillar, and
a windshield supporting portion disposed adjacent to the windshield receiving portion of the front pillar, the windshield supporting portion being integrally formed with the mounting portion, and configured and arranged relative to the mounting portion to restrict a movement of the windshield at least in a transverse direction substantially parallel to a main surface of the windshield.

27. The windshield spacer structure as recited in claim 1, wherein
the windshield molding has a front section extending over the windshield supporting portion of the windshield spacer.

28. The windshield spacer structure as recited in claim 1, wherein
the windshield molding has a rear section extending along the mounting portion of the windshield spacer so that the rear section of the windshield molding is releasably fastened to the fastening structure of the mounting portion by the fastener.

29. The windshield spacer as recited in claim 13, further comprising
a windshield bottom abutment portion extending substantially perpendicularly from the windshield edge abutment portion toward a first side of the windshield edge abutment portion, the windshield bottom abutment portion being configured and arranged relative to the mounting portion to restrict a movement of the windshield in a direction substantially perpendicular to the main surface of the windshield.

30. The windshield spacer as recited in claim 29, wherein
the mounting portion is disposed on a second side of the windshield edge abutment portion of the windshield supporting portion that is opposite from the first side.

* * * * *